US012750880B2

(12) United States Patent
Song et al.

(10) Patent No.: US 12,750,880 B2
(45) Date of Patent: Sep. 29, 2026

(54) SYSTEMS AND METHODS FOR PROVIDING SUB-BAND FULL-DUPLEX COVERAGE FOR LEGACY USER EQUIPMENT

(71) Applicant: Verizon Patent and Licensing Inc., Basking Ridge, NJ (US)

(72) Inventors: Lei Song, San Diego, CA (US); Lily Zhu, Parsippany, NJ (US); Zheng Zhao, Plainsboro, NJ (US); Cindy Dong, Bridgewater, NJ (US); Jin Yang, Orinda, CA (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 673 days.

(21) Appl. No.: 18/170,171

(22) Filed: Feb. 16, 2023

(65) Prior Publication Data

US 2024/0284502 A1 Aug. 22, 2024

(51) Int. Cl.
*H04W 74/08* (2024.01)

(52) U.S. Cl.
CPC .................................... *H04W 74/08* (2013.01)

(58) Field of Classification Search
CPC ..... H04W 74/08; H04W 72/21; H04W 72/23; H04W 72/542; H04W 72/51
See application file for complete search history.

(56) References Cited

U.S. PATENT DOCUMENTS 11,848,897 B2 * 12/2023 Huang ...................... H04L 5/14
2013/0070722 A1 * 3/2013 Li ......................... H04L 5/0003 370/329
2015/0092626 A1 * 4/2015 Cheng ................... H04W 72/21 370/280
2021/0136696 A1 * 5/2021 Burke ................... H04L 5/1461
2021/0320779 A1 * 10/2021 Huang ...................... H04L 5/14
2022/0394732 A1 * 12/2022 Hosseini ................... H04L 5/14
2024/0072989 A1 * 2/2024 Zhang ................... H04L 5/0092
(Continued)

FOREIGN PATENT DOCUMENTS

CN 116633479 A * 8/2023 .......... H04J 11/0026
EP 3195493 B1 * 1/2020 ........... H04B 7/0617

OTHER PUBLICATIONS

Digital Front End Algorithms for Sub-Band Full Duplex Syeda Midhat Hasan Rizvi and Khaled Al Khatee (Year: 2022).*
(Continued)

*Primary Examiner* — Kodzovi Acolatse
*Assistant Examiner* — Anindita Sen

(57) ABSTRACT

A network device may receive an indication to enable sub-band full duplex uplink transmission for a first user equipment (UE), and may determine whether the first UE and a second UE are associated with a separation that is more than a threshold separation. The network device may enable the sub-band full duplex uplink transmission for the first UE based on determining that the first UE and the second UE are associated with a separation that is more than the threshold separation. The network device may deny the sub-band full duplex uplink transmission for the first UE based on determining that the first UE and the second UE are associated with a separation that is less than the threshold separation.

20 Claims, 9 Drawing Sheets

(56) References Cited

U.S. PATENT DOCUMENTS

| | | | | |
|---|---|---|---|---|
| 2024/0179698 | A1* | 5/2024 | Zhang | H04W 72/044 |
| 2024/0214948 | A1* | 6/2024 | Rudolf | H04L 5/14 |

OTHER PUBLICATIONS

3GPP tr38588 (Year: 2022).*
A Survey on 5G NR Sub-band Full Duplex (Year: 2025).*
A State-of-the-art Survey on Full-duplex Network Design (Year: 2024).*

* cited by examiner

SYSTEMS AND METHODS FOR PROVIDING SUB-BAND FULL-DUPLEX COVERAGE FOR LEGACY USER EQUIPMENT

BACKGROUND

A radio access network (RAN) may utilize sub-band full-duplex to allow for transmit and receive at the same time. Sub-band full-duplex is beneficial to RAN capacity and uplink (UL) coverage enhancement over time division duplex (TDD), such as has been specified for fifth generation (5G) New Radio (5G NR) RANs. Sub-band full-duplex may enable the RAN to enhance UL coverage for some user equipment (UEs) in an otherwise downlink (DL) traffic dominated cell, which may be useful for uplink-intensive applications (e.g., for video transmission, voice-over-New-Radio (VoNR), etc.).

DETAILED DESCRIPTION OF EXAMPLE EMBODIMENTS

Figure 1A:
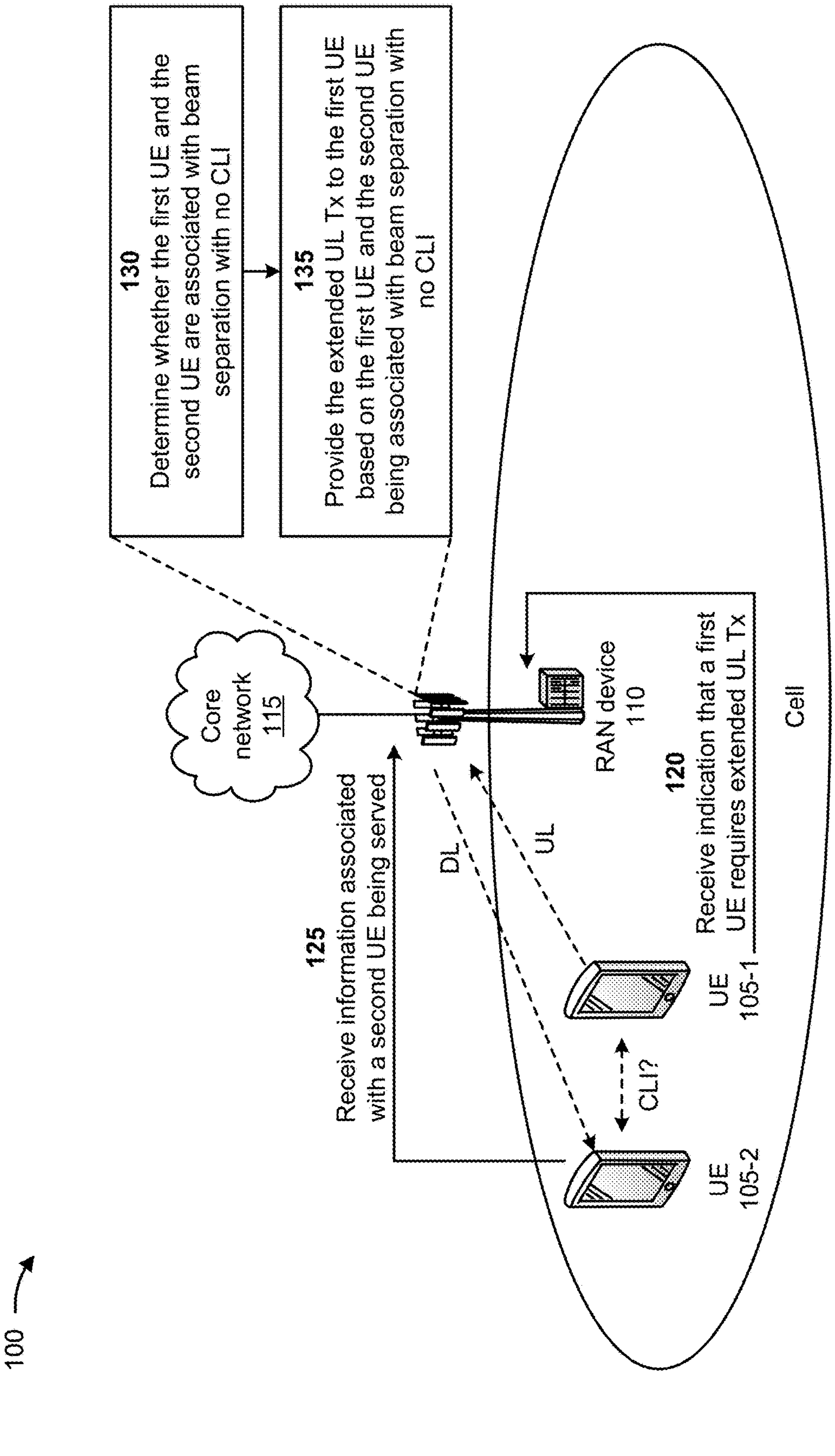
FIGS. 1A-1F are diagrams of an example associated with providing sub-band full-duplex coverage for legacy UEs.

The following detailed description of example implementations refers to the accompanying drawings. The same reference numbers in different drawings may identify the same or similar elements.

Sub-band full-duplex operation (e.g., extended UL transmission (Tx)) is increasingly possible in fifth-generation (5G) RANs using advanced RAN devices (e.g., gNodeBs or gNBs). An advanced RAN device may enable sub-band full-duplex by providing spatial isolation (e.g., a using beam steering or other spatial multiplexing), frequency isolation (e.g., using sub-bands), receive (Rx) filtering (e.g., using sub-bands), beam nulling (e.g., using beam steering), self-cancelation (e.g., both analog (beam) and digital (baseband)), and/or the like. Sub-band full duplex can be enabled where cross-link interference (CLI) between UEs and/or RAN devices is minimized. Although a RAN device may provide sub-band full-duplex operation, legacy UEs may fail to include one or more features required to utilize the sub-band full-duplex. For example, legacy UEs may be unable to transmit and receive signals at the same time, may be unable to provide necessary information to assist a RAN device in provisioning of sub-band full-duplex, may be unable to perform radio frequency and/or digital filtering, may be unable to measure potential CLI with other legacy UEs and/or between two RAN devices, and the like.

Thus, current network and UE configurations consume computing resources (e.g., processing resources, memory resources, communication resources, and/or the like), networking resources, and/or other resources associated with enabling sub-band full-duplex (e.g., extended UL Tx) for a UE experiencing CLI with another UE (e.g., receiving DL signals), degrading performance of the other UE due to the CLI with the UE, degrading performance of the UE due to the CLI with the other UE, failing to enable sub-band full-duplex for UEs not experiencing CLI, and/or the like.

Some implementations described herein provide a system and method that provides sub-band full-duplex coverage for legacy UEs. For example, a network device (e.g., a RAN device) may receive an indication that a first UE requires extended uplink transmission, and may determine whether the first UE and a second UE are associated with a separation that does not produce CLI. The RAN device provides the extended uplink transmission to the first UE based on determining that the first UE and the second UE are associated with a separation that does not produce CLI, and does not provide the extended uplink transmission to the first UE when the separation will likely produce CLI. The RAN device may determine separation based on which beams are servicing the first UE and second UE, such that where a beam separation between a first beam serving the first UE is more than a threshold separation from a second beam serving the second UE, the RAN device may enable the extended uplink transmission to the first UE. The RAN device may also determine separation by calculating a distance between a location of the first UE and a location of the second UE (which may be useful, for example, where the first UE and second UE are served by the same beam, or where the first beam and second beam are within the threshold beam separation).

To avoid CLI associated with the transmissions by other RAN devices (e.g., at a cell edge), the system and method may include RAN devices that provide to neighboring RAN devices a notification identifying the regions in which it is providing extended uplink transmission to its served UEs. For example, the RAN device may include an information element in a cell resource coordination message sent to neighboring RAN devices that indicates locations where extended uplink transmission is scheduled. When determining whether to provide extended uplink transmission to a first UE, the RAN device may determine whether a beam separation between a first beam serving the first UE is more than a threshold separation from a region identified as being in use by a neighboring RAN device.

In this way, the system and method provide sub-band full-duplex coverage for legacy UEs. For example, the RAN device may address the potential for CLI so that legacy UEs may benefit from sub-band full-duplex (e.g., by receiving more UL throughput and coverage). The RAN device may utilize beam or UE positioning to identify potential CLI between UEs, and to enable sub-band full-duplex for UEs not likely to experience CLI. The RAN device may enhance spatial information sharing with other RAN devices to avoid inter-cell CLI. Thus, the RAN device may conserve computing resources, networking resources, and/or other resources that would have otherwise been consumed by enabling sub-band full-duplex (e.g., extended UL Tx) for a UE experiencing CLI with another UE (e.g., receiving DL signals), degrading performance of the other UE due to the CLI with the UE, degrading performance of the UE due to the CLI with the other UE, failing to enable sub-band full-duplex for UEs not experiencing CLI, and/or the like.

FIGS. 1A-1F are diagrams of an example 100 associated with providing sub-band full-duplex coverage for legacy UEs. As shown in FIGS. 1A-1F, example 100 includes UEs 105 (e.g., a first UE 105-1 and a second UE 105-2), RAN devices 110, and a core network 115. Further details of the UEs 105, the RAN devices 110, and the core network 115 are provided elsewhere herein.

As shown in FIG. 1A, and by reference number 120, the RAN device 110 may receive an indication that the first UE 105-1 should be provided the ability to use extended uplink (UL) transmission (Tx) (e.g., sub-band full-duplex). For example, the first UE 105-1 may utilize an application (e.g., a VoNR application) that may benefit from extended UL Tx in a cell served by the RAN device 110. The first UE 105-1 may generate the indication that the first UE 105-1 is requesting extended UL Tx (e.g., based on the first UE 105-1 utilizing the application). The first UE 105-1 may provide the indication that the first UE 105-1 is requesting extended UL Tx to the RAN device 110, and the RAN device 110 may receive the indication that the first UE 105-1 is requesting extended UL Tx. In some implementations, the RAN device 110 may not receive the indication that the first UE 105-1 is requesting extended UL Tx, but rather may determine that the first UE 105-1 should be provided extended UL Tx, such as based on usage of the cell and the RAN device 110 by the first UE 105-1, or by another notification (e.g., from elements of core network 115).

As further shown in FIG. 1A, and by reference number 125, the RAN device 110 may receive information associated with the second UE 105-2 being served. For example, the second UE 105-2 may be served by the same RAN device 110 as UE 105-1, and may be engaged in transmissions over the RAN (e.g., by utilizing a streaming application associated with downlink (DL) traffic). The second UE 105-2 may generate the information associated with the second UE 105-2 (e.g., identification of the second UE 105-2, a UE type of the second UE 105-2, and/or the like) based on the second UE 105-2 utilizing the application. The second UE 105-2 may provide the information associated with the second UE 105-2 to the RAN device 110, and the RAN device 110 may receive the information associated with the second UE 105-2. In some implementations, the RAN device 110 may not receive the information associated with the second UE 105-2, but rather may determine the information associated with the second UE 105-2 based on usage of the cell and the RAN device 110 by the second UE 105-2, or by another notification (e.g., from elements of core network 115).

As further shown in FIG. 1A, and by reference number 130, the RAN device 110 may determine whether the first UE 105-1 and the second UE 105-2 are associated with a separation that will not produce CLI (e.g., any CLI will be below a level that negatively impacts communications). In order to determine whether to serve the first UE 105-1 with the extended UL Tx, in some implementations the RAN device 110 may determine whether the first UE 105-1 and the second UE 105-2 are associated with a threshold level of beam separation. For example, a first beam may be serving the first UE 105-1, and is providing service in a first region of the cell associated with the RAN device 110. A second beam may be serving the second UE 105-2, and is providing service in a second region of the cell that is different than the first region. The RAN device 110 may determine that the first UE 105-1 and the second UE 105-2 are associated with a threshold level of beam separation and thus no CLI should exist between the first UE 105-1 and the second UE 105-2 (e.g., because the first region and second region are sufficiently spatially separated).

As further shown in FIG. 1A, and by reference number 135, the RAN device 110 may enable the use of extended UL Tx for the first UE 105-1 based on the first UE 105-1 and the second UE 105-2 being associated with a separation that is not expected to produce CLI. For example, if the RAN device 110 determines that the first UE 105-1 and the second UE 105-2 are associated with a beam separation that is more than a threshold amount of beam separation, the RAN device 110 may provide the extended UL Tx to the first UE 105-1. In some implementations, the RAN device may enable the extended UL Tx for the first UE 105-1 by scheduling the first UE 105-1 to use certain of the available sub-bands for uplink transmissions (e.g., sub-bands that would normally be used for downlink transmissions). The RAN device may provide scheduling information to the first UE 105-1 that contains indications that certain of the available sub-bands are to be used for uplink transmissions. The extended UL Tx may provide improved uplink services to the first UE 105-1 (e.g., improved upload bandwidth) and an application in use on the first UE 105-1.

In some implementations, the RAN device 110 may determine locations of the first UE 105-1 and the second UE 105-2, and use these locations to determine whether CLI may exist between the first UE 105-1 and the second UE 105-2 if extended UL Tx is provided to the first UE 105-1. For example, when the beam separation between the beams serving the first UE and second UE is below the beam separation threshold (e.g., where the first UE and second UE are being served by the same beam, or the first beam and second beam are serving adjacent regions), it may still be possible to provide extended UL Tx if the actual distance between the first UE and second UE is more than a distance threshold that would produce unacceptable levels of CLI.

Figure 1B:
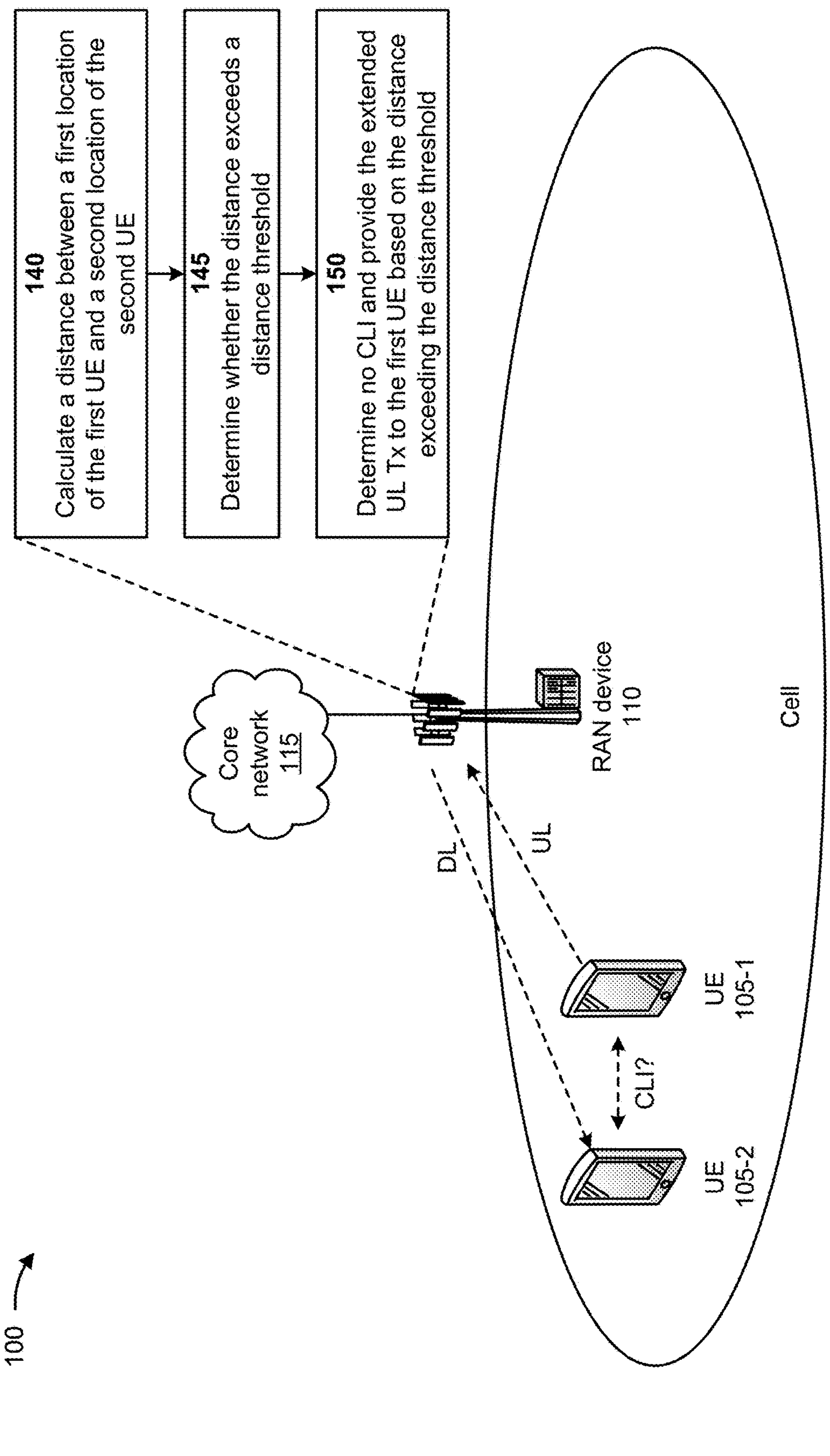

As shown in FIG. 1B, and by reference number 140, the RAN device 110 may calculate a distance between a first location of the first UE 105-1 and a second location of the second UE 105-2. In some implementations, when calculating the distance between the first location of the first UE 105-1 and the second location of the second UE 105-2, the RAN device 110 may utilize a UE positioning process to receive a first estimated location of the first UE 105-1 and a second estimated location of the second UE 105-2. The RAN device 110 may then calculate the distance based on the first estimated location of the first UE 105-1 and the second estimated location of the second UE 105-2. The UE positioning process may provide the estimated UE locations with a particular accuracy (e.g., less than ten meters and with a latency of less than ten milliseconds).

As further shown in FIG. 1B, and by reference number 145, the RAN device 110 may determine whether the distance exceeds a distance threshold. For example, the RAN device 110 may establish a distance threshold (e.g., in meters) for the calculated distance between the first location of the first UE 105-1 and the second location of the second UE 105-2. In some implementations, the RAN device 110 may determine that the distance exceeds the distance threshold. Alternatively, the RAN device 110 may determine that the distance fails to exceed the distance threshold.

As further shown in FIG. 1B, and by reference number 150, if the RAN device 110 determines that the distance exceeds the distance threshold, the RAN device 110 may determine that there is not expected to be CLI between the first UE 105-1 and the second UE 105-2 (e.g., since they are spaced far enough apart to prevent CLI). When the RAN device 110 determines that there is not expected to be CLI between the first UE 105-1 and the second UE 105-2, the RAN device 110 may provide the extended UL Tx to the first UE 105-1.

In some implementations, the distance determinations described above may be performed by the RAN device after determining that the beam separation threshold is not exceeded by the beams serving the first UE and second UE. In other implementations, the RAN device may perform the distance determinations described above as an alternative to doing the beam separation determinations described above (and with reference to FIG. 1A). The use of either/both operations may depend on factors such as: cell loading, cell size, beam count, RAN device capabilities, etc.

If the RAN device determines that first UE 105-1 and second UE 105-2 are not sufficiently separated (and therefore there is a possibility for CLI), the RAN device my deny the use of enhanced UL Tx. In some implementations, this denial may take the form of retaining the normal DL/UL use of available sub-bands by the first UE 105-1. In some implementations, a response message may be provided with an indication of the denial. In some implementations, denial may occur after enhanced UL Tx has been enabled for the first UE 105-1, such as if the location of the first UE 105-1 changes and/or the location of the second UE 105-2 changes, resulting in a separation that is no longer above the threshold for potential CLI.

Figure 1C:
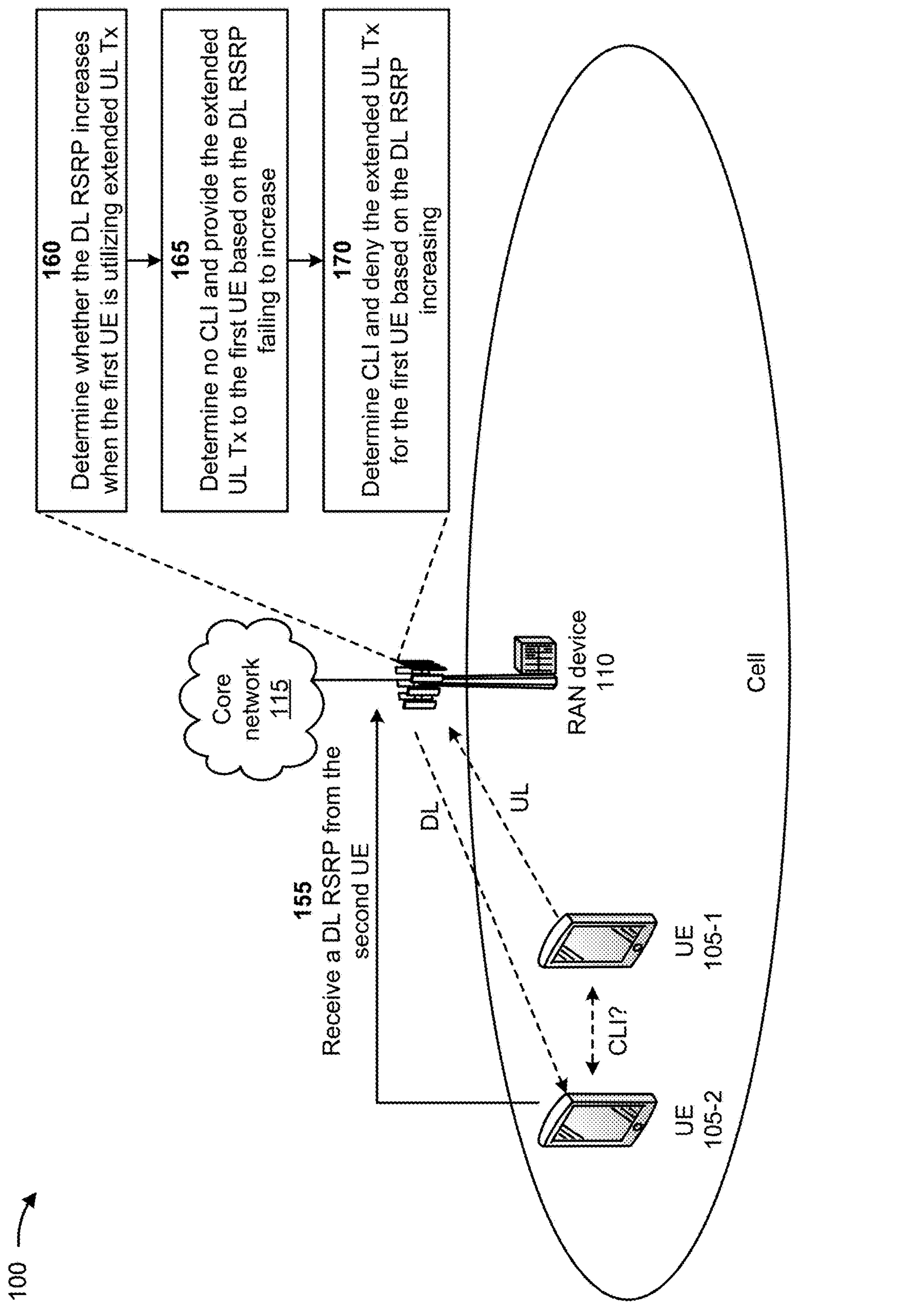

In some implementations, the RAN device 110 may use DL reference signal received power (RSRP) reports from the UEs in its serving cell to ensure that CLI from extended UL Tx is not impacting communications with the RAN device. For example, if other UEs in the service cell report increased RSRP during the times when a UE is using enhanced UL Tx, that is an indication that CLI is being caused by those UL transmissions, and the RAN device should end the enhanced UL Tx. As shown in FIG. 1C, and by reference number 155, the RAN device 110 may receive an RSRP report from the second UE 105-2. In some implementations, the RAN device 110 may request that the second UE 105-2 measure the DL RSRP and provide the DL RSRP report to the RAN device 110. In some implementations, the second UE 105-2 may periodically report its RSRP automatically to the RAN device 110.

As further shown in FIG. 1C, and by reference number 160, the RAN device 110 may determine whether the DL RSRP increases when the first UE 105-1 is utilizing the extended UL Tx. For example, the second UE 105-2 may measure a first DL RSRP during a first time period when the first UE 105-1 is not utilizing the extended UL Tx, and may measure a second DL RSRP during a second time period when the first UE 105-1 is utilizing the extended UL Tx. The second UE 105-2 may provide the first DL RSRP and the second DL RSRP in reports to the RAN device 110. The RAN device 110 may determine whether the second DL RSRP is greater than the first DL RSRP to determine whether the DL RSRP increases when the first UE 105-1 is utilizing the extended UL Tx. The RAN device 110 may determine that the DL RSRP increases when the first UE 105-1 is utilizing the extended UL Tx (e.g., when the second DL RSRP is greater than the first DL RSRP). Alternatively, the RAN device 110 may determine that the DL RSRP fails to increase when the first UE 105-1 is utilizing the extended UL Tx (e.g., when the second DL RSRP is not greater than the first DL RSRP).

As further shown in FIG. 1C, and by reference number 165, the RAN device 110 may determine that the DL RSRP fails to increase when the first UE 105-1 is utilizing the extended UL Tx (e.g., when the second DL RSRP is not greater than the first DL RSRP), indicating that there is no CLI being caused by the first UE's use of extended UL Tx, and may continue to provide the extended UL Tx to the first UE 105-1. Alternatively, as shown by reference number 170, the RAN device 110 may determine that the DL RSRP increases when the first UE 105-1 is utilizing the extended UL Tx (e.g., when the second DL RSRP is greater than the first DL RSRP), and conclude that this indicates CLI is being produced due to the use of extended UL Tx by the first UE 105-1. The RAN device 110 may then terminate the use of extended UL Tx by the first UE 105-1 based on the DL RSRP increasing.

In some implementations, the system and method may include facilities to allow RAN devices 110 to provide to each other a notification identifying the regions in which they are providing sub-band full duplex uplink transmissions to its served UEs 105. This may be useful to avoid CLI associated with the transmissions between UEs 105 and other RAN devices 110 (e.g., at a cell edge). Each RAN device 110 may then use this uplink information to adjust determinations of whether to allow a UE 105 to perform extended UL Tx. For example, each RAN device 110 may include an information element in a cell resource coordination message sent to neighboring RAN devices that indicates those locations where extended uplink transmission is scheduled. When determining whether to provide extended uplink transmission to the first UE 105-1, the RAN device 110 may determine whether a beam separation between a first beam serving the first UE 105-1 is more than the threshold separation from a region identified as being in use by a neighboring RAN device 110.

In some implementations, the indication of which locations are using extended UL Tx may be done using a bitmap where each bit is associated with a specific region, and reflects whether enhanced UL Tx has been enabled for that region. Receiving RAN devices 110 may then use the bitmap (and a translation mechanism such as a lookup table) to adjust their preexisting information on the DL/UL pattern being used by the RAN device 110 providing the indication. In some implementations, the indication may include a partial or full DL/UL pattern associated with providing RAN device 110 that reflects the instances where enhanced UL Tx is enabled. Other types of indications would also be possible.

Figure 1D:
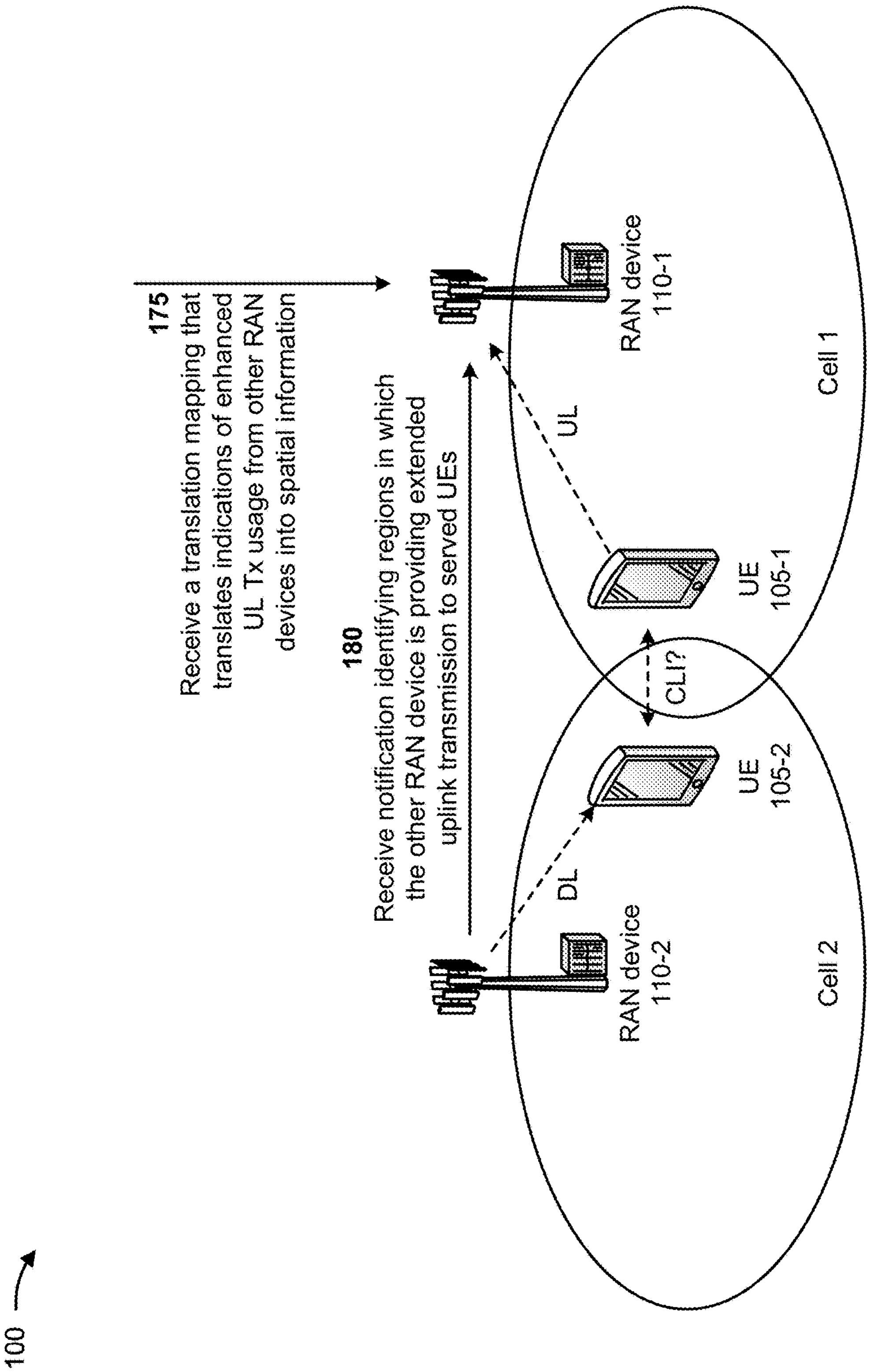

As shown in FIG. 1D, the RAN device 110-1 may provide service to a first cell (e.g., Cell 1) and another RAN device 110-2 may provide service to a second cell (e.g., Cell 2). The first UE 105-1 may be located within the first cell and the second UE 105-2 may be located in the second cell, but are proximate to each other due to their locations near the edges of Cell 1 and Cell 2, respectively.

As further shown in FIG. 1D, and by reference number 175, the RAN device 110-1 may receive a translation mapping that allows the RAN device 110-1 to translate indications of enhanced UL Tx usage from other RAN devices (including RAN device 110-2) into spatial information relative to RAN device 110-1. For example, an operations, administration, and maintenance (OAM) function of the core network 115 may provide, to the RAN device 110-1 (e.g., and the other RAN device 110-2, although not shown) the translation mapping. In some implementations, the translation mapping may be a lookup table that maps information in the usage indications (e.g., bit fields) to spatial information.

As further shown in FIG. 1D, and by reference number 180, the RAN device 110-1 may receive a notification from RAN device 110-2 identifying the regions in which RAN device 110-2 is providing extended uplink transmission to its served UEs 105. For example, the other RAN device 110-2 may be serving the second UE 105-2, and may generate the notification to include a first value indicating that enhanced UL Tx is scheduled to be utilized for the second UE 105-2 in its region, and a second value indicating that is not scheduled to be utilized for the second UE 105-2 in its region. In some implementations, the indication may be provided as an information element in a cell resource coordination message sent between RAN devices (e.g., over an Xn interface). In one example, the indication may comprise a synchronization signal block (SSB) resource indication information element, which may be included in cell resource coordination message.

Figure 1E:
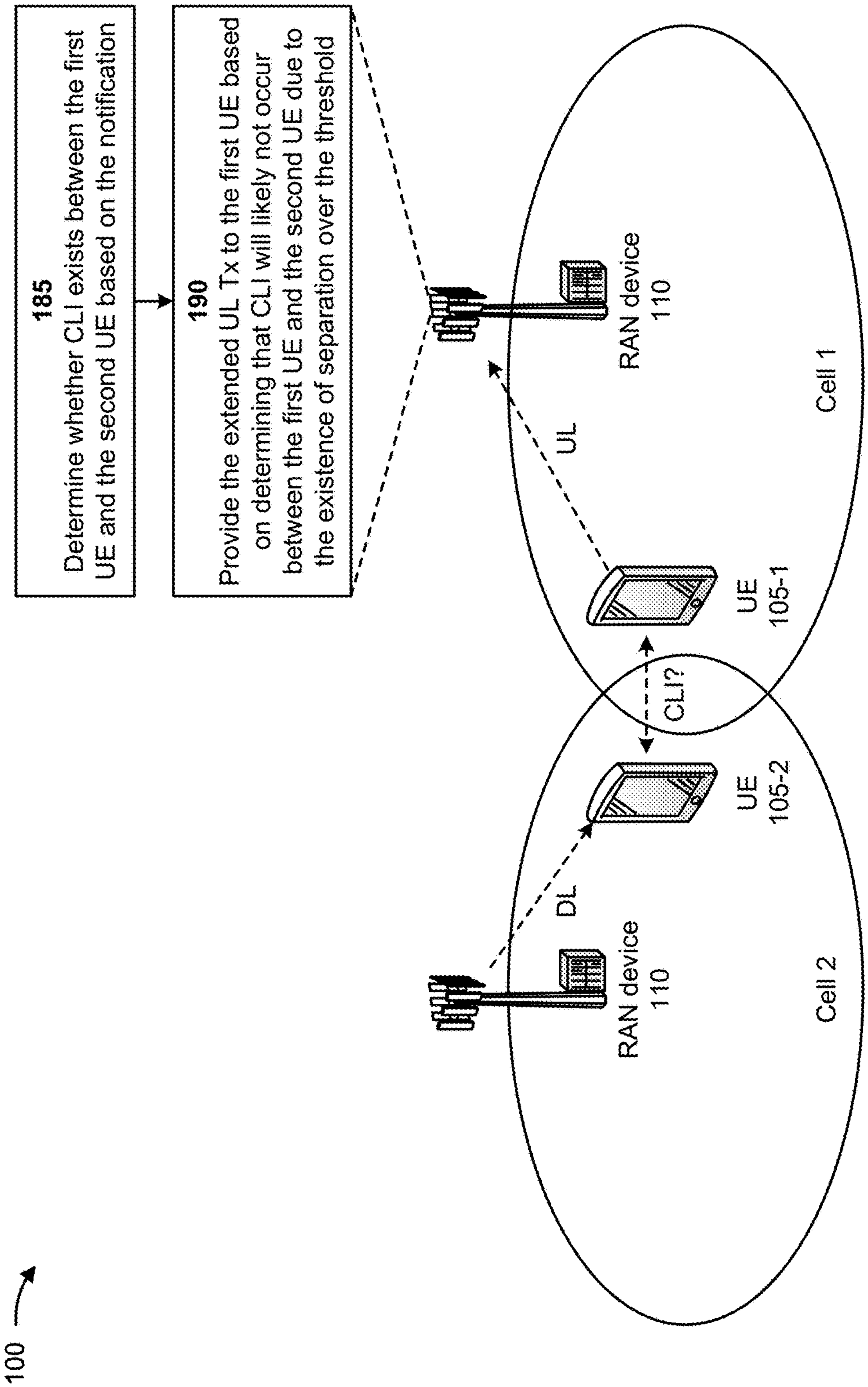

As shown in FIG. 1E, and by reference number 185, the RAN device 110-1 may determine whether CLI will likely exist between the first UE 105-1 and the second UE 105-2 based on the notification from RAN device 110-2. For example, the RAN device 110-1 may identify, by applying the indications of enhanced UL Tx usage in the notification to the translation mapping, spatial information associated with the usage by second UE 105-2 of radio resources. The RAN device 110-1 may determine whether CLI will likely exist between the first UE 105-1 and the second UE 105-2 based on the spatial information (e.g., a region of operation, coordinates, etc.), similar as has been described above. For example, the RAN device 110-1 may determine a separation between the first UE 105-1 and second UE 105-2, such by determining whether a beam separation (which may be based on service regions) is more than a beam separation threshold.

As further shown in FIG. 1E, and by reference number 190, the RAN device 110-1 may provide the extended UL Tx to the first UE 105-1 based on determining that CLI will likely not occur between the first UE 105-1 and the second UE 105-2 due to the existence of separation over the threshold.

Figure 1F:
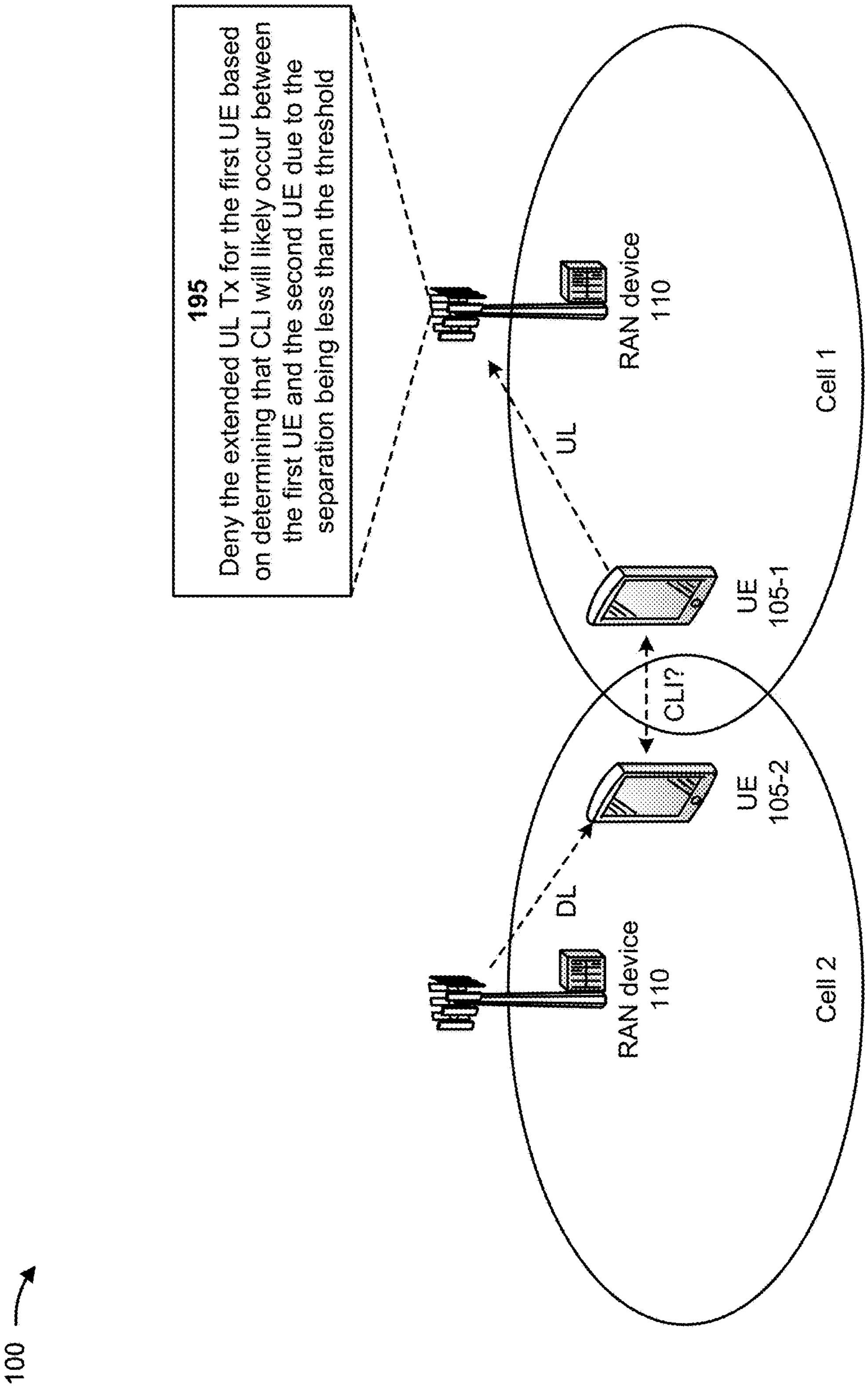

As shown in FIG. 1F, and by reference number 195, the RAN device 110-1 may deny extended UL Tx for the first UE 105-1 based on determining that CLI will likely occur between the first UE 105-1 and the second UE 105-2 due to the separation being less than the threshold.

In this way, the RAN device 110 provides sub-band full-duplex coverage for legacy UEs 105. For example, the RAN device 110 may address the CLI issues associated with uplink transmission in downlink sub-bands without the need to modify the legacy UE's existing radio interface, so that legacy UEs 105 may obtain the benefits of sub-band full-duplex (e.g., more UL throughput). Thus, the RAN device 110 may conserve computing resources, networking resources, and/or other resources that would have otherwise been consumed by enabling sub-band full-duplex (e.g., extended UL Tx) for a UE 105 experiencing CLI with another UE 105 (e.g., receiving DL signals), degrading performance of the other UE 105 due to the CLI with the UE 105, degrading performance of the UE 105 due to the CLI with the other UE 105, failing to enable sub-band full-duplex for UEs 105 not experiencing CLI, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
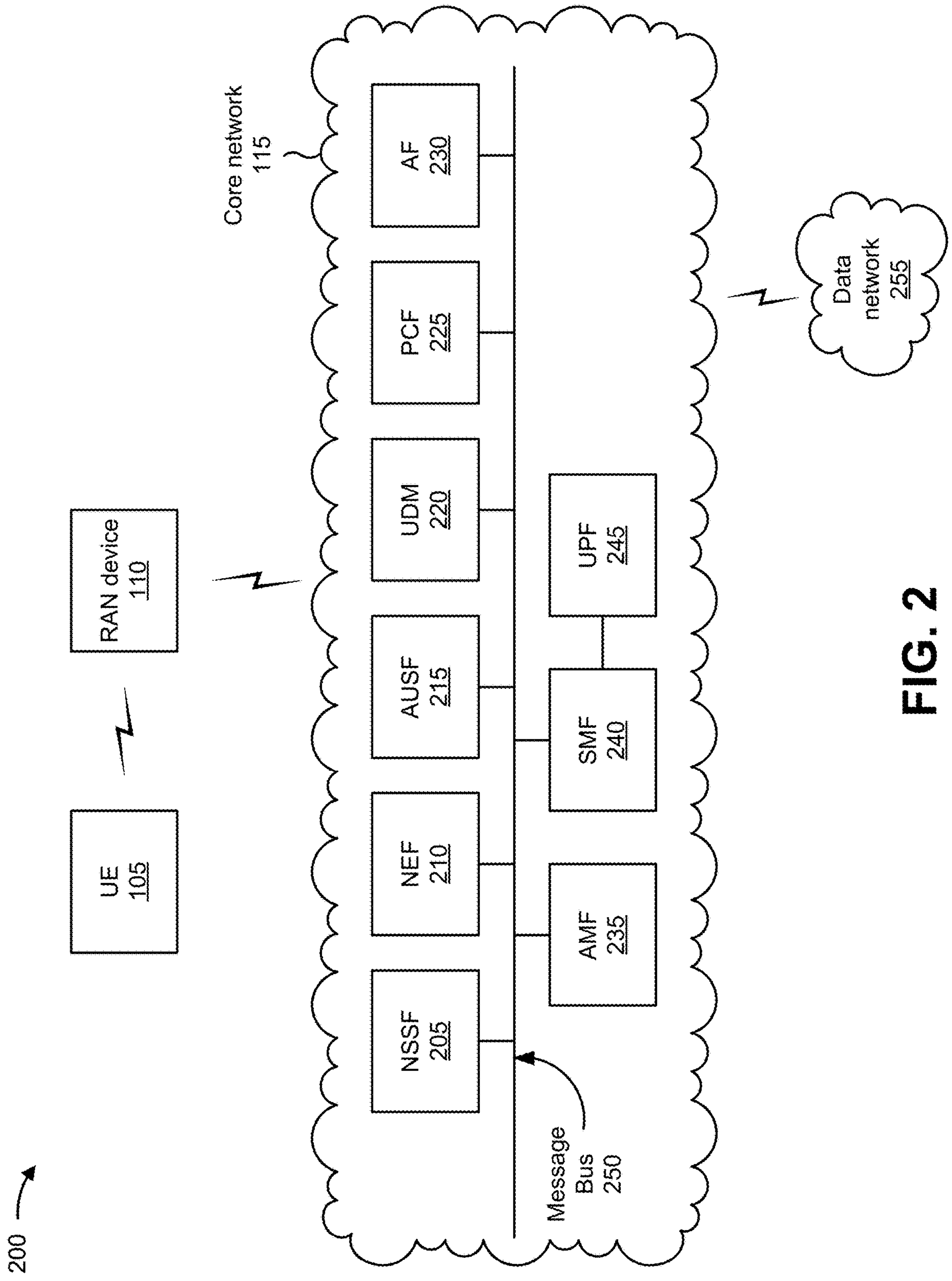
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN device 110, the core network 115, and a data network 255. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN device 110 may support, for example, a cellular radio access technology (RAT). The RAN device 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN device 110 may transfer traffic between the UE 105 (e.g., using a cellular RAT), one or more base stations (e.g., using a wireless interface or a backhaul interface, such as a wired backhaul interface), and/or the core network 115. The RAN device 110 may provide one or more cells that cover geographic areas.

In some implementations, the RAN device 110 may perform scheduling and/or resource management for the UE 105 covered by the RAN device 110 (e.g., the UE 105 covered by a cell provided by the RAN device 110). In some implementations, the RAN device 110 may be controlled or coordinated by a network controller, which may perform load balancing, network-level configuration, and/or other operations. The network controller may communicate with the RAN device 110 via a wireless or wireline backhaul. In some implementations, the RAN device 110 may include a network controller, a self-organizing network (SON) module or component, or a similar module or component. In other words, the RAN device 110 may perform network control, scheduling, and/or network management functions (e.g., for uplink, downlink, and/or sidelink communications of the UE 105 covered by the RAN device 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment IP address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The message bus 250 represents a communication structure for communication among the functional elements. In other words, the message bus 250 may permit communication between two or more functional elements.

The data network 255 includes one or more wired and/or wireless data networks. For example, the data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
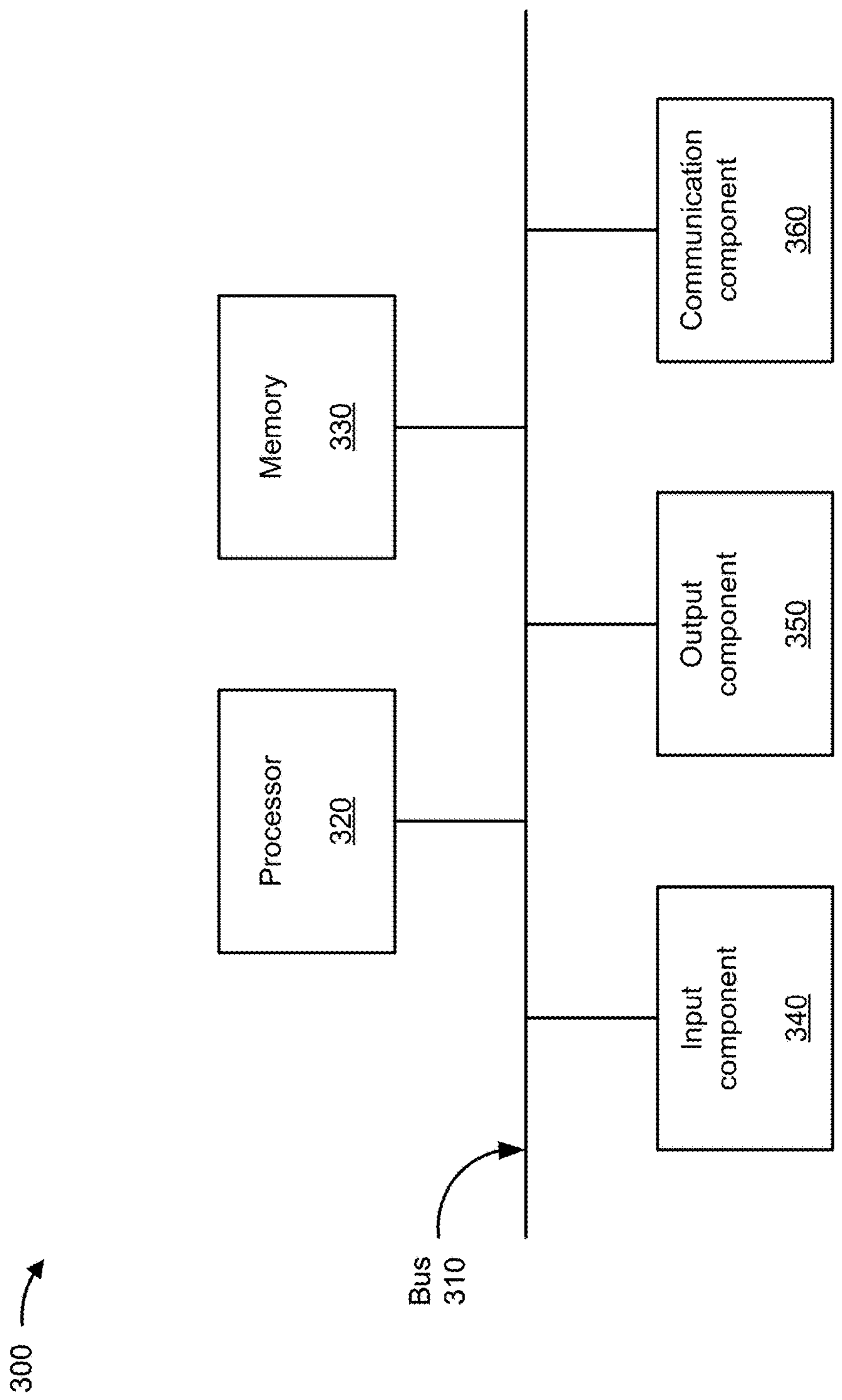
FIG. 3 is a diagram of example components of one or more devices of FIG. 2.

FIG. 3 is a diagram of example components of a device 300, which may correspond to the UE 105, the RAN device 110, the NSSF 205, the NEF 210, the AUSF 215, the UDM 220, the PCF 225, the AF 230, the AMF 235, the SMF 240, and/or the UPF 245. In some implementations, the UE 105, the RAN device 110, the NSSF 205, the NEF 210, the AUSF 215, the UDM 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
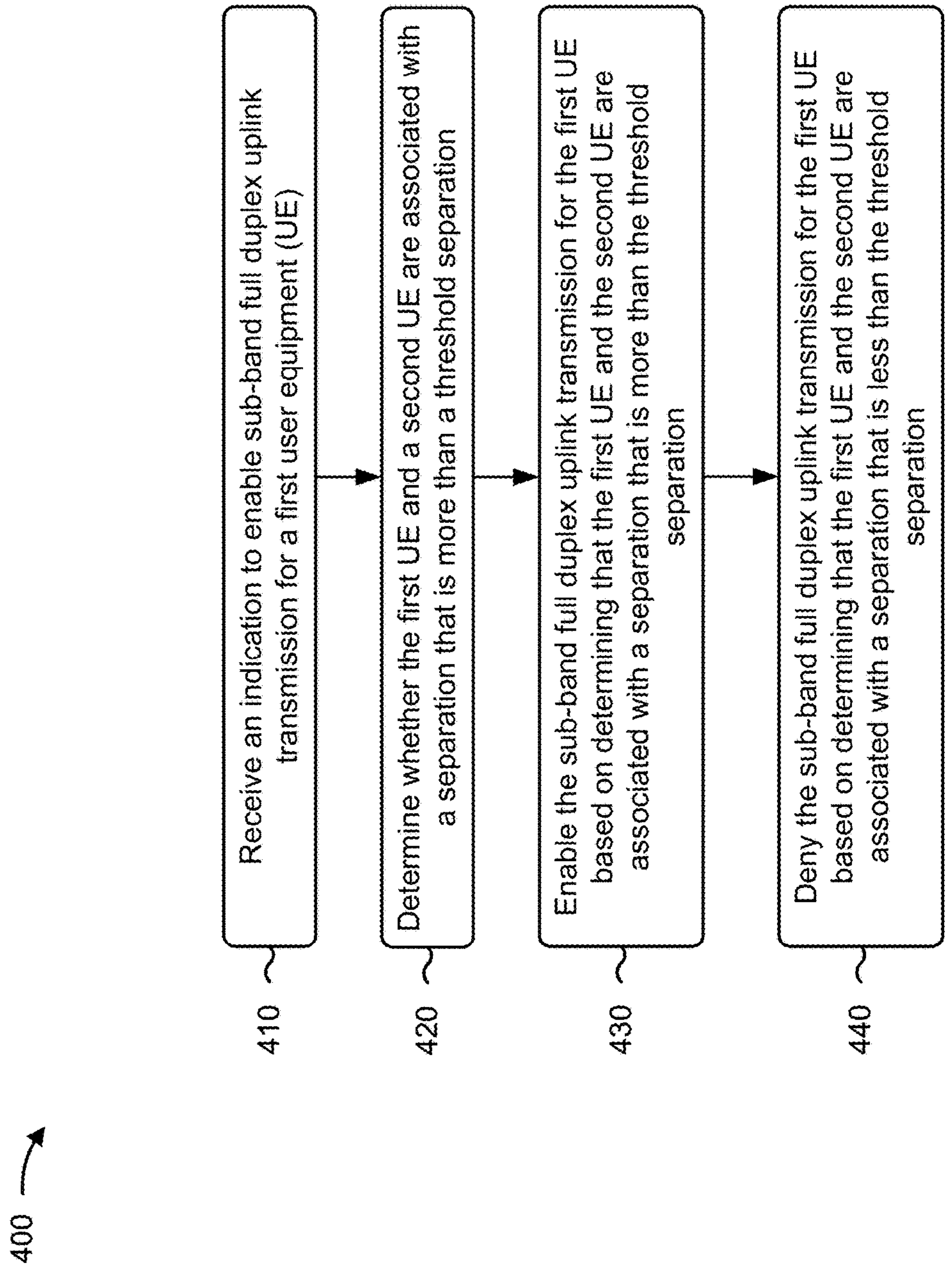
FIG. 4 is a flowchart of an example process for providing sub-band full-duplex coverage for legacy UEs.

FIG. 4 is a flowchart of an example process 400 for providing sub-band full-duplex coverage for legacy UEs. In some implementations, one or more process blocks of FIG. 4 may be performed by a network device (e.g., the RAN device 110). In some implementations, one or more process blocks of FIG. 4 may be performed by another device or a group of devices separate from or including the network device, such as a UE (e.g., the UE 105-1). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving an indication to enable sub-band full duplex uplink transmission for a first UE (block 410). For example, the network device may receive an indication to enable sub-band full duplex uplink transmission for a first UE, as described above.

As further shown in FIG. 4, process 400 may include determining whether the first UE and a second UE are associated with a separation that is more than a threshold separation (block 420). For example, the network device may determine whether the first UE and a second UE are associated with a separation that is more than a threshold separation, as described above. In some implementations, determining whether the first UE and a second UE are associated with a separation that is more than a threshold separation includes determining whether a first beam serving the first UE and a second beam serving the second UE have a beam separation that is more than a threshold beam separation. In some implementations, determining whether the first UE and a second UE are associated with a separation that is more than a threshold separation includes calculating a distance between a first location of the first UE and a second location of the second UE, and determining whether the distance exceeds a distance threshold.

As further shown in FIG. 4, process 400 may include enabling the sub-band full duplex uplink transmission for the first UE based on determining that the first UE and the second UE are associated with a separation that is more than the threshold separation (block 430). For example, the network device may enable the sub-band full duplex uplink transmission for the first UE based on determining that the first UE and the second UE are associated with a separation that is more than the threshold separation, as described above.

As further shown in FIG. 4, process 400 may include denying the sub-band full duplex uplink transmission for the first UE based on determining that the first UE and the second UE are associated with a separation that is less than the threshold separation (block 440). For example, the network device may deny the sub-band full duplex uplink transmission for the first UE based on determining that the first UE and the second UE are associated with a separation that is less than the threshold separation, as described above.

In some implementations, process 400 includes receiving a DL RSRP from the second UE, determining whether the DL RSRP increases during a time period when the first UE is utilizing the sub-band full duplex uplink transmission, and denying the sub-band full duplex uplink transmission by the first UE based on determining that the DL RSRP increased during the time period.

In some implementations, process 400 includes receiving a notification that identifies sub-band full duplex uplink transmission usage information by another network device, determining based on the sub-band full duplex uplink information whether the first UE and a third UE are separated by more than the threshold, and denying the use of sub-band full duplex uplink transmission by the first UE based on determining that the first UE and third UE are not separated by more than the threshold. In some implementations, the notification of sub-band full duplex uplink transmission usage information is included in a cell resource coordination message. In some implementations, process 400 includes receiving a translation mapping to allow the network device to translate the sub-band full duplex uplink transmission usage information into spatial information relative to the network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device, an indication to enable sub-band full duplex uplink transmission for a first user equipment (UE);

determining, by the network device, whether the first UE and a second UE are associated with a spatial separation that is more than a threshold separation;

enabling, by the network device, the sub-band full duplex uplink transmission for the first UE based on determining that the first UE and the second UE are associated with the spatial separation that is more than the threshold separation;

denying, by the network device, the sub-band full duplex uplink transmission for the first UE based on determining that the first UE and the second UE are associated with a spatial separation that is less than the threshold separation;

receiving, by the network device, a downlink (DL) reference signal received power (RSRP) from the second UE;

determining, by the network device, whether the DL RSRP increases during a time period when the first UE is utilizing the sub-band full duplex uplink transmission; and denying, by the network device, the sub-band full duplex uplink transmission by the first UE based on determining that the DL RSRP increased during the time period.

2. The method of claim 1, wherein determining whether the first UE and the second UE are associated with the spatial separation that is more than the threshold separation includes:

determining whether a first beam serving the first UE and a second beam serving the second UE have a beam separation that is more than a threshold beam separation.

3. The method of claim 1, wherein determining whether the first UE and the second UE are associated with the spatial separation that is more than the threshold separation includes:

calculating a distance between a first location of the first UE and a second location of the second UE; and determining whether the distance exceeds a distance threshold.

4. The method of claim 1, further comprising:

receiving a notification that identifies sub-band full duplex uplink transmission usage information by another network device;

determining based on the sub-band full duplex uplink transmission usage information whether the first UE and a third UE are separated by more than a threshold; and denying use of sub-band full duplex uplink transmission by the first UE based on determining that the first UE and the third UE are not separated by more than the threshold.

5. The method of claim 4, wherein the notification that identifies sub-band full duplex uplink transmission usage information is included in a cell resource coordination message.

6. The method of claim 4, further comprising:

receiving a translation mapping to allow the network device to translate the sub-band full duplex uplink transmission usage information into spatial information relative to the network device.

7. A network device, comprising:

one or more processors configured to:

receive an indication to enable sub-band full duplex uplink transmission for a first user equipment (UE);

determine whether the first UE and a second UE are associated with a spatial separation that is more than a threshold separation;

enable the sub-band full duplex uplink transmission for the first UE based on determining that the first UE and the second UE are associated with the spatial separation that is more than the threshold separation;

deny the sub-band full duplex uplink transmission for the first UE based on determining that the first UE and the second UE are associated with a spatial separation that is less than the threshold separation;

receive a downlink (DL) reference signal received power (RSRP) from the second UE;

determine whether the DL RSRP increases during a time period when the first UE is utilizing the sub-band full duplex uplink transmission; and deny the sub-band full duplex uplink transmission by the first UE based on determining that the DL RSRP increased during the time period.

8. The network device of claim 7, wherein the one or more processors, to determine whether the first UE and the second UE are associated with the spatial separation that is more than the threshold separation, are configured to:

determine whether a first beam serving the first UE and a second beam serving the second UE have a beam separation that is more than a threshold beam separation.

9. The network device of claim 7, wherein the one or more processors, to determine whether the first UE and the second UE are associated with the spatial separation that is more than the threshold separation, are configured to:

calculate a distance between a first location of the first UE and a second location of the second UE; and determine whether the distance exceeds a distance threshold.

10. The network device of claim 7, wherein the one or more processors are further configured to:

receive a notification that identifies sub-band full duplex uplink transmission usage information by another network device;

determine based on the sub-band full duplex uplink transmission usage information whether the first UE and a third UE are separated by more than a threshold; and deny use of sub-band full duplex uplink transmission by the first UE based on determining that the first UE and the third UE are not separated by more than the threshold.

11. The network device of claim 10, wherein the notification that identifies sub-band full duplex uplink transmission usage information is included in a cell resource coordination message.

12. The network device of claim 10, wherein the one or more processors are further configured to:

receive a translation mapping to allow the network device to translate the sub-band full duplex uplink transmission usage information into spatial information relative to the network device.

13. A non-transitory computer-readable medium storing a set of instructions, the set of instructions comprising:

one or more instructions that, when executed by one or more processors of a network device, cause the network device to:

receive an indication to enable sub-band full duplex uplink transmission for a first user equipment (UE);

determine whether the first UE and a second UE are associated with a spatial separation that is more than a threshold separation;

enable the sub-band full duplex uplink transmission for the first UE based on determining that the first UE and the second UE are associated with the spatial separation that is more than the threshold separation;

deny the sub-band full duplex uplink transmission for the first UE based on determining that the first UE and the second UE are associated with a spatial separation that is less than the threshold separation;

receive a downlink (DL) reference signal received power (RSRP) from the second UE;

determine whether the DL RSRP increases during a time period when the first UE is utilizing the sub-band full duplex uplink transmission; and deny the sub-band full duplex uplink transmission by the first UE based on determining that the DL RSRP increased during the time period.

14. The non-transitory computer-readable medium of claim 13, wherein the one or more instructions, that cause the network device to determine whether the first UE and the second UE are associated with the spatial separation that is more than the threshold separation, cause the network device to:

determine whether a first beam serving the first UE and a second beam serving the second UE have a beam separation that is more than a threshold beam separation.

15. The non-transitory computer-readable medium of claim 13, wherein the one or more instructions, that cause the network device to determine whether the first UE and the second UE are associated with the spatial separation that is more than the threshold separation, cause the network device to:

calculate a distance between a first location of the first UE and a second location of the second UE; and determine whether the distance exceeds a distance threshold.

16. The non-transitory computer-readable medium of claim 13, wherein the one or more instructions further cause the network device to:

receive a notification that identifies sub-band full duplex uplink transmission usage information by another network device;

determine based on the sub-band full duplex uplink transmission usage information whether the first UE and a third UE are separated by more than a threshold; and deny use of sub-band full duplex uplink transmission by the first UE based on determining that the first UE and the third UE are not separated by more than the threshold.

17. The non-transitory computer-readable medium of claim 16, wherein the notification that identifies sub-band full duplex uplink transmission usage information is included in a cell resource coordination message.

18. The method of claim 1, wherein the network device is a cellular radio access technology device providing one or more cells for a geographic area.

19. The network device of claim 7, wherein the network device is a cellular radio access technology device providing one or more cells for a geographic area.

20. The non-transitory computer-readable medium of claim 13, wherein the network device is a cellular radio access technology device providing one or more cells for a geographic area.

* * * * *